United States Patent [19]

O'Leary et al.

[11] 4,342,613
[45] Aug. 3, 1982

[54] METHOD OF BONDING SURFACES WITH A SOLID ADHESIVE

[76] Inventors: James N. O'Leary, 94 Newton Dr., Nashua, N.H. 03060; Edward J. Bruzinski, 41 Stepney Rd., W. Redding, Conn. 06896

[21] Appl. No.: 222,660

[22] Filed: Jan. 5, 1981

Related U.S. Application Data

[63] Continuation of Ser. No. 77,602, Sep. 21, 1979, abandoned.

[51] Int. Cl.³ ............................................. B32B 7/00
[52] U.S. Cl. .................................... 156/310; 156/277; 156/295; 156/324; 428/420
[58] Field of Search ............... 156/310, 295, 277, 324, 156/291; 428/420

[56] References Cited

U.S. PATENT DOCUMENTS

| | | | |
|---|---|---|---|
| 3,385,744 | 5/1968 | Van Sciver | 156/310 |
| 3,840,419 | 10/1974 | De Keyser et al. | 156/324 |
| 4,092,202 | 5/1978 | Bergk et al. | 156/324 |
| 4,184,005 | 1/1980 | Bauriedel et al. | 156/324 |

Primary Examiner—John J. Gallagher
Attorney, Agent, or Firm—Thompson, Birch, Gauthier & Samuels

[57] ABSTRACT

A method of applying a two component solid adhesive formulation to surfaces to be bonded. Each component of the formulation is applied to a surface in the form of discrete discontinuous deposits. When the sheets pass through nip rolls, the opposed deposits contact and are thoroughly mixed forming a continuous film of adhesive which is subsequently cured.

7 Claims, 7 Drawing Figures

METHOD OF BONDING SURFACES WITH A SOLID ADHESIVE

This is a continuation of application Ser. No. 77,602 filed Sept. 21, 1979, now abandoned.

The invention relates to a method of coating a reactive adhesive system on surfaces to be combined.

In reactive adhesive systems where the components will react on contact, the components are typically coated on the separate surfaces to be combined, see U.S. Pat. Nos. 4,126,504; 3,518,159; and 2,557,826. Generally, the components are applied in thin-film form.

U.S. Pat. No. 3,536,561 applies one reactive component of a two component system in the form of dots. However, prior to contacting the other component of the system, the dots coalesce to form a continuous line.

Adhesives have also been applied in dots to insure breathability of the joined materials, see U.S. Pat. Nos. 3,808,088 and 3,251,727. Further, U.S. Pat. Nos. 4,155,178 and 3,672,952 teach applying adhesives in strips to a surface to be bonded.

With reactive adhesives it is essential that there be proper mixing of the components to insure maximum bonding. This is particularly important when the adhesives which cure as a transparent bond, are used to join clear sheets and the final ascetic appearance of the bonded sheets is important, such as in food packaging.

In some applications therefore, adhesives are used which will cure or set as transparent adhesive layer. If incomplete mixing of the components occurs, then streaks and/or blemishes (flaws) appear.

Solid adhesive formulations have been developed for the bonding of sheet material. The solid adhesive formulations are multi-component formulations which cure subsequent to mixing. These formulations are advantageous in that there is no solvent emitted upon curing. In theory, it would appear that passing opposed surfaces, each surface coated with a film of one component of a solid adhesive system, through nip rolls would effect the mixing desired. In practice this has not been the result. The industry has experienced difficulties with solid adhesive formulations in achieving a uniform film which could be suitably mixed when passed through nip rolls at ambient temperatures. Thus, the industry generally has used a hot melt solid adhesive to ensure the uniformity of coating or alternatively continues to use a solvent-based adhesive system wherein the solvent is emitted into the environment upon curing.

Therefore, there exists a need for proper application of a solid adhesive which can be applied at ambient temperature conditions eliminating the need to use a hot melt or alternatively eliminating the requirement of a solvent to be evaporated during curing.

The present invention embodies a method of application of a solid adhesive formulation which overcomes the difficulties of the prior art. Namely, coating of the formulation at ambient temperature is achieved but more importantly, a uniform cured adhesive bond results from complete mixing of the components of the formulation.

The present invention is directed to a method of application of a multi-component reactive solid adhesive formulation. More particularly, the invention embodies a two-component reactive solid adhesive formulation, each component (100% solids) applied to surface of a sheet, the surfaces (sheets) to be bonded one to the other.

At least one component of the formulation is applied in the form of discrete discontinuous deposits to one of the surfaces to be bonded. The deposits on the surface maintain the dimensional stability until such time that they mate with the opposed surface, when the sheets pass through nip rolls. The opposed surface may or may not have the other component applied as discrete deposits, i.e., it may be coated as a film, streaks, etc.

In the preferred embodiment, the deposits on each surface are spaced apart and dimensioned such that as the sheets pass through the nip rolls, the two components are intimately mixed and a continuous adhesive bond is formed.

The discrete discontinuous deposits may be applied in various geometric shapes depending upon the specific viscosity of the components at the time of application and the surface characteristics of the sheet to which the deposits are applied.

DESCRIPTION OF PREFERRED EMBODIMENT

The invention will be described in reference to a two component solid adhesive formulation. However, the invention embodies any reactive adhesive system where the reaction is effected by mixing of the components e.g., any organic synthetic adhesive system including elastomers, polysulfides, thermoplastic resins (polyolefin, isobutylene, polyamides, polyvinyl acetate), thermosetting resins (epoxy, phenol formaldehyde, polyvinyl butyral, cyanoacrylate, acrylic, urethane, aminoplast, and polyester); and silicone polymers.

Generally, the types of reaction effected by the intimate mixing of the separate components of the invention may be generally described as follows: urethanes, polymers containing the urethane (NCO) group may react with groups having an active hydrogen atom such as hydroxyl, amino, epoxide, mercaptan and carboxyl; epoxy resins cured or crosslinked with polyamines, polyamides, polysulfides, urea, phenol formaldehyde and acids or acid anhydrides through coupling or condensation reactions; acrylics by crosslinking with polyisocynates, epoxides, low molecular weight urea, melamine or phenol formaldehyde resins which react with corresponding groups ($OH_2$, $NH_2$, $COOH$) in the acrylic polymers; and polyester polymers, unsaturated, which can be crosslinked by peroxide compounds.

Solid urethane adhesive formulations are well known in the art. The invention will be described with reference to the following formulation although any of the prior art formulations, particularly the urethane formulations, may be used.

EXAMPLE

Equal parts by weight of:

Component A, for example a polyol, such as Supercast A, from Upaco Adhesives, Inc. of Nashua, New Hampshire; and Component B, for example a reactive urethane formulation, such as Supercast C available from Upaco Adhesives, Inc.

The physical properties of Supercast A are solids—100%; viscosity—120–200 cps; color—water white, slight haze; and specific gravity—1.085 gr/cc plus or minus 5%. For Supercast C, solids—100%; viscosity 50–150 cps; color—medium Amber; and specific gravity 1.211 gr/cc plus or minus 5%.

Components A and B are applied as discrete deposits in stoichiometric amounts to the surfaces of the sheets to be bonded.

Figure 1:
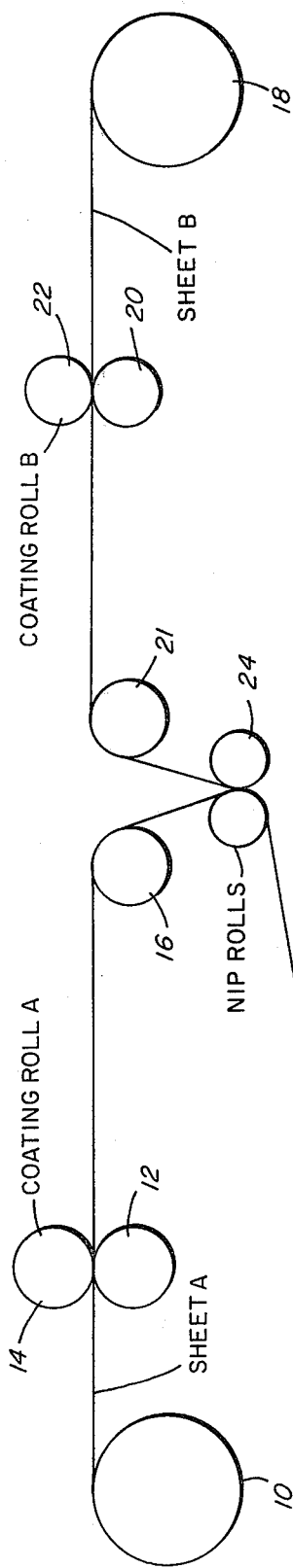
FIG. 1 is a flow diagram of a process embodying the invention.

More particularly, referring to FIG. 1, sheet A, such as a polyethylene sheet, unwinds from a roll 10, passes through a support roll 12 and a coating roll 14, and over a guide roll 16. Likewise, sheet B, such as a polyethylene sheet, passes from a supply roll 18 through a support roll 20 and a coating roll 22, and over a guide roll 21.

Sheets A and B then pass through nip rolls 24, the adhesively coated surfaces engage and the laminated sheets A and B are collected on a rewind roll 26. Except for the design of the coating rolls for this particular application, the method of movement of the sheets A and B is conventional.

Component A is applied by coating roll 14 and Component B is applied by coating roll 22. For the specific system, the rate of application of each component is between 0.1 to 2.0 lbs. per 3,000 square feet, preferably 0.3 to 1.0 lbs. per 3,000 square feet.

Figure 2A:
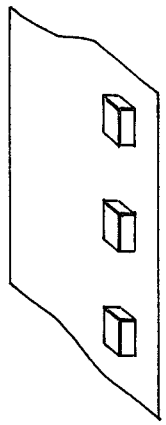
FIGS. 2a, b, and c are perspective views of discrete deposits.
Figure 3A:
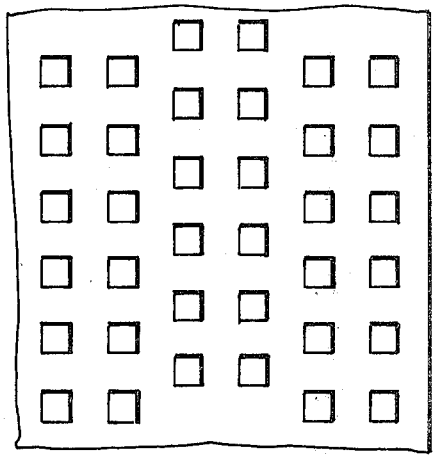
FIGS. 3a, b and c are plan views of various deposit patterns.

The form of the deposits applied are as shown in FIG. 2a, namely, square pins. Each deposit is 16 microns high and has a width of 60 microns. The deposits are spaced apart 60 microns (side-to-side). The deposits are coated on the surfaces in parallel lines as shown in FIG. 3a. The rolls 14 and 22 are gravure rolls of known construction. However, the surfaces of the rolls are modified such that a plurality of rows of closely spaced discrete recesses of any desired geometric configuration are formed in the surface of the rolls. The components A and B are slot fed (not shown) on the rolls 14 and 22. Doctor blades (not shown) remove the components from the surfaces of the rolls leaving the components within the recesses. As the surface of each roll engages its associated sheet, the components in the recesses are deposited on the surfaces of the sheets. The adhesive components are coated on the sheets at ambient temperature, say between 40 to 100° F. The components are not heated. However, the surface roll temperature at the combining nip rolls 24 may reach 200° F. as is usual. The thickness of the adhesive bond formed after passing through the nip rolls 24 may range between 0.01 to 0.60, preferably 0.015 to 0.30 mils.

It is important that both components be applied as discrete discontinuous deposits. In this embodiment, the method of application is through the use of gravure rolls which are characterized by patterned recessed surfaces which will result in the application of the adhesive components as the discrete discontinuous deposits.

Typically, the deposits may range in width between about 60 to 400 microns per linear inch longitudinally and transversely at a volume of 0.1 to 10 lbs/3000 ft$^2$, preferably, 0.3 to 5.0 lbs/3000 ft$^2$.

Figure 2B:
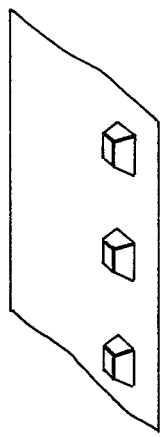
Figure 2C:
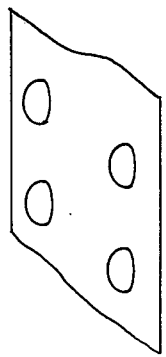
Figure 3B:
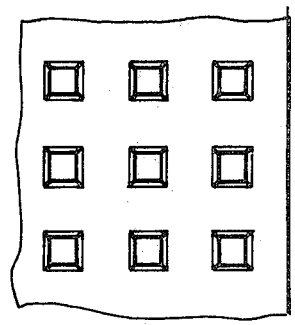
Figure 3C:
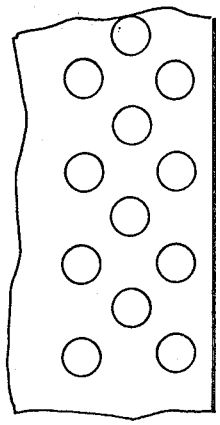

Referring to FIG. 2a, b and c, illustrative types of deposits within the scope of the invention are shown in FIG. 2a as square pin deposits, FIG. 2b as truncated pyramid deposits, and FIG. 2c as dome-shaped deposits. Other types of geometric configurations may also be used The deposits are applied to the surfaces in a uniform manner. FIG. 3a shown groupings of parallel rolls applied in alternating offset relationship. FIG. 3b shows deposits applied in parallel relationship along both longitudinal and transverse axes. FIG. 3c shows deposits applied one row to the next in parallel offset alternating relationship. Other uniform geometric patterns may also be employed. It is preferred that both rolls employ the same pattern and the same geometric shape of the deposits.

The speed of the films A and B passing through the nip rolls 24 is controlled to insure that the deposits are in register one to the other as the sheets pass through the nip rolls. This provides complete mixing of the components of the adhesive formulation, the spreading of the mixed components such that when cured, a continuous film or bond is achieved between sheets A and B.

The viscosity of the components is such that the discrete deposits will maintain their structural integrity until they pass through the nip rolls 24.

It has been found on some film surfaces, such as a surface with a high surface tension, the deposit will hold as applied, while the integrity of the deposits may tend to diminish somewhat with surfaces of a low surface tension. The viscosity of the deposits when applied preferably is between 75–500 cps.

Within the scope of the invention, the mating discrete deposits do not have to be of identical shape or size. That is, the deposits on one film can be dome-shaped, square, etc., and the deposits on the other film can be a distinctly different geometric configuration, or can be continuous deposits (films, streaks, etc.). The types of sheets that can be bonded include: polyester, polyolefins (PP-PE), inomers (Surlyn ®) Nylons ®, cellophanes, polyvinyl chlorides, propionates, carbonate; sheets coated with polyvinylidene chloride, nitrocellulose, and acrylics; metal foils including, for example, aluminum, copper, steel; paper, including glassine; cellulose acetate, etc.

Having described the invention, what we now claim is:

1. A method for adhesively bonding surfaces which includes:
   (a) applying to a first surface at least one component of a solventless reactive adhesive formulation as discrete discontinuous non-linear deposits in a predetermined pattern to form a coated surface;
   (b) applying to a second surface another component of the solventless reactive formulation as discontinuous non-linear deposits in a predetermined pattern to form a coated surface, the deposits on both the first and second surface coated in such an amount and spacing that they maintain their dimensional stability until such time that the deposits on the first surface contact the deposits on the second surface;
   (c) mating the coated surfaces one to the other, the deposits on the first and second surfaces intimately mixing and reacting to form a continuous homogeneous film adhesive bond between the surfaces; and,
   (d) curing the adhesive to form a uniform continuous bond between the surfaces.

2. The method of claim 1 wherein the adhesive formulation is a reactive adhesive system selected from the group consisting of urethane, epoxy, arcylic and polyester resins and combinations thereof.

3. The method of claim 2 wherein the adhesive formulation is a 100% solids adhesive formulation.

4. The method of claim 1 which includes applying the first and second components to the surfaces at ambient temperatures.

5. The method of claims 1, 2 or 3 wherein the discrete deposits have a width of between 60 to 400 microns.

6. The method of claims 1, 2 or 3 which includes applying each component of the formulation to the surface in a range of between about 0.1 to 2.0 pounds per three thousand square feet.

7. The method of claims 1, 2 or 3 wherein each of the reactive components has a viscosity in the range of between about 75–400 cps and the surfaces to which the components are applied are such that the deposits will maintain their dimensional stability until such time that the surfaces are mated.

* * * * *